(12) United States Patent
Ding et al.

(10) Patent No.: US 12,330,122 B2
(45) Date of Patent: Jun. 17, 2025

(54) PREPARATION METHOD FOR CHELATING MEMBRANE FOR PURIFYING WET ELECTRONIC CHEMICALS

(71) Applicants: JIANGSU JIUMO HI-TECH CO., LTD., Jiangsu (CN); SHANDONG RESEARCH INSTITUTE OF LONG MEMBRANE TECHNOLOGY DEVELOPMENT CO., LTD., Shandong (CN)

(72) Inventors: Xiaobin Ding, Jiangsu (CN); Fenjuan Xiangli, Shandong (CN); Pingping Dai, Jiangsu (CN); Cheng Wang, Jiangsu (CN)

(73) Assignees: JIANGSU JIUMO HI-TECH CO., LTD., Jiangsu (CN); SHANDONG RESEARCH INSTITUTE OF LONG MEMBRANE TECHNOLOGY DEVELOPMENT CO., LTD., Shandong (CN)

( * ) Notice: Subject to any disclaimer, the term of this patent is extended or adjusted under 35 U.S.C. 154(b) by 0 days.

(21) Appl. No.: 18/836,726

(22) PCT Filed: Jul. 19, 2023

(86) PCT No.: PCT/CN2023/108034
§ 371 (c)(1),
(2) Date: Aug. 7, 2024

(87) PCT Pub. No.: WO2024/002382
PCT Pub. Date: Jan. 4, 2024

(65) Prior Publication Data
US 2025/0144570 A1    May 8, 2025

(30) Foreign Application Priority Data
Jun. 28, 2022   (CN) .......................... 202210751020.7

(51) Int. Cl.
*B01D 67/00*   (2006.01)
*B01D 69/02*   (2006.01)
*B01D 71/36*   (2006.01)

(52) U.S. Cl.
CPC ..... *B01D 67/0088* (2013.01); *B01D 67/0083* (2013.01); *B01D 67/009* (2013.01);
(Continued)

(58) Field of Classification Search
CPC ................ B01D 2257/60; B01D 71/36; B01D 67/0088; B01J 45/00
See application file for complete search history.

(56) References Cited

U.S. PATENT DOCUMENTS

| 2008/0197070 A1 | 8/2008 | Sirkar et al. |
| 2018/0117538 A1 | 5/2018 | Bruening et al. |
| 2022/0161201 A1 | 5/2022 | Soliman et al. |

FOREIGN PATENT DOCUMENTS

| CN | 102675675 A | * | 9/2012 |
| CN | 104861199 A | | 8/2015 |

(Continued)

OTHER PUBLICATIONS

Zhang Zhi-hui et al., "Adsorption Behaviors of Ni2+ in the DTPA-MA/PVDF Blended Membrane" Journal of Tangshan Teachers College, vol. 32, No. 2, pp. 16-20 (Mar. 31, 2010).

*Primary Examiner* — Alex A Rolland
(74) *Attorney, Agent, or Firm* — SZDC Law PC

(57) ABSTRACT

Disclosed in the present disclosure is a preparation method for a chelating membrane for purifying wet electronic chemicals, including the following steps: performing hydrophilic treatment on a porous PTFE membrane to obtain a hydrophilic base membrane; sequentially cleaning a chelating resin with a hydrochloric acid solution, a sodium hydroxide solution and deionized water, and then drying; grinding and sieving the cleaned and dried chelating resin to
(Continued)

obtain a powder; mixing the powder with polyisobutylene and a polyhexafluoroethylene emulsion, and performing vacuum defoaming to form a membrane coating solution; coating the hydrophilic base membrane with the membrane coating solution to prepare a chelating membrane; and sequentially washing the chelating membrane with a hydrochloric acid solution, a sodium hydroxide solution and pure water until the chelating membrane is neutral, and then drying and storing the chelating membrane.

9 Claims, 2 Drawing Sheets

(52) U.S. Cl.
CPC ..... *B01D 67/0095* (2013.01); *B01D 67/0097* (2013.01); *B01D 69/02* (2013.01); *B01D 71/36* (2013.01); *B01D 2323/02* (2013.01); *B01D 2323/081* (2022.08); *B01D 2323/12* (2013.01); *B01D 2323/56* (2022.08); *B01D 2325/36* (2013.01)

(56) References Cited

FOREIGN PATENT DOCUMENTS

| | | | |
|---|---|---|---|
| CN | 114904403 | A | 8/2022 |
| JP | H0321390 | A | 1/1991 |
| JP | H0394883 | A | 4/1991 |
| JP | 2017001029 | A | 1/2017 |
| WO | 0070012 | A1 | 11/2000 |

\* cited by examiner

PREPARATION METHOD FOR CHELATING MEMBRANE FOR PURIFYING WET ELECTRONIC CHEMICALS

This application is the National Stage Application of PCT/CN2023/108034, filed on Jul. 19, 2023, which claims priority to Chinse Patent Application No. 202210751020.7, filed on Jun. 28, 2022, which is incorporated by reference for all purposes as if fully set forth herein.

TECHNICAL FIELD

The present disclosure relates to the technical field of chelating membranes, and in particular, to a preparation method for a chelating membrane for purifying wet electronic chemicals.

BACKGROUND

Ultra-clean and high-purity reagents are one of key basic chemical materials in a production process of an ultra-large scale integrated circuit (IC) and are mainly used for cleaning and corrosion of chips as well as cleaning of silicon wafers (wafers), and the purity and cleanliness of the reagents have an extremely important impact on the yield, electrical performance and reliability of the integrated circuit. When the wafers are polluted by metal ions, great harm will be caused to semiconductor components. For example, Fe, Cu, Na and other metals will lead to the production of OISF, thereby increasing a leakage current during binding of a p-n junction and shortening the life of few carriers. The ultra-clean and high-purity reagents have the characteristics of many varieties, large consumption, high technical requirements, a short shelf life, strong corrosion and the like.

In China, the ultra-clean and high-purity reagents have been developed and produced since the 1970s. Until now, solid particle impurities in the ultra-clean and high-purity reagents have been controlled, but contents of metal ions in the ultra-clean and high-purity reagents need to be controlled by traditional methods such as distillation and rectification, and these methods have not only a low removal rate of metal ions but also high energy consumption.

SUMMARY

In view of the disadvantages of the prior art, the present disclosure provides a preparation method for a chelating membrane for purifying wet electronic chemicals. The preparation method has a high removal rate of trace metal ions and low energy consumption.

The present disclosure is realized by adopting the following technical solutions.

A preparation method for a chelating membrane for purifying wet electronic chemicals includes the following steps:
  performing hydrophilic treatment on a porous PTFE membrane to obtain a hydrophilic base membrane;
  sequentially cleaning a chelating resin with a hydrochloric acid solution, a sodium hydroxide solution and deionized water, and then drying;
  grinding and sieving the cleaned and dried chelating resin to obtain a powder;
  mixing the powder with polyisobutylene and a polyhexafluoroethylene emulsion, and performing vacuum defoaming to form a membrane coating solution; and
  coating the hydrophilic base membrane with the membrane coating solution to prepare a chelating membrane.

Further, the preparation method further includes the following steps:
  sequentially washing the chelating membrane with a hydrochloric acid solution, a sodium hydroxide solution and pure water until the chelating membrane is neutral, and then drying and storing the chelating membrane.

Further, the step of performing hydrophilic treatment on a porous PTFE membrane to obtain a hydrophilic base membrane specifically includes the following steps:
  adding the porous PTFE membrane to ethanol for soaking for 0.5-2 h, and then drying in air for 5-30 min;
  adding nitric acid to a 2-10 wt % potassium permanganate aqueous solution for dissolution at room temperature for 0.5-2 h to obtain a mixed solution;
  placing the treated PTFE membrane in the mixed solution, and performing heating in a water bath at 50-90° C. for 1-3 h; and
  after the heating is completed, placing the membrane in ultrapure water for ultrasonic washing for 0.1-0.5 h, and then drying in an oven at 40-60° C. for 1-2 h to obtain the hydrophilic base membrane.

Further, a volume ratio of the nitric acid to the potassium permanganate aqueous solution is 1:(20-30).

Further, the steps of sequentially cleaning a chelating resin with a hydrochloric acid solution, a sodium hydroxide solution and deionized water, and then drying specifically include:
  sequentially cleaning the chelating resin with the hydrochloric acid solution, the sodium hydroxide solution and the deionized water, and then drying in an oven at 80-90° C. for 1-2 h, where the chelating resin is an iminodiacetic acid chelating resin.

Further, the powder is 1,000-3,000 mesh.

Further, the steps of mixing the powder with polyisobutylene and a polyhexafluoroethylene emulsion, and performing vacuum defoaming to form a membrane coating solution specifically include:
  mixing the powder with the polyisobutylene and the polyhexafluoroethylene emulsion at 150-200° C. for 4-8 h, and performing vacuum defoaming for 3-6 h to form the membrane coating solution; and a mass ratio of the powder to the polyisobutylene to the polyhexafluoroethylene emulsion is (60-75):(5-10):(15-35).

Further, the step of coating the hydrophilic base membrane with the membrane coating solution to prepare a chelating membrane specifically includes:
  coating the hydrophilic base membrane with the membrane coating solution at a temperature of 150-200° C. to prepare the chelating membrane.

Further, the steps of sequentially washing the chelating membrane with a hydrochloric acid solution, a sodium hydroxide solution and pure water until the chelating membrane is neutral, and then drying and storing the chelating membrane specifically include:
  sequentially washing the chelating membrane with the hydrochloric acid solution, the sodium hydroxide solution and the pure water until the chelating membrane is neutral, then drying the chelating membrane in an oven at 80-90° C. for 1-2 h, and storing the chelating membrane for later use; and the pure water is electronic-grade ultrapure water and is at a grade of equal to or greater than E1.1.

Further, a preparation process of the chelating membrane is carried out in a clean environment, and the clean environment has a cleanliness class of equal to or less than Class 10,000.

Compared with the prior art, the present disclosure has the following advantages.

1. Compared with traditional multistage distillation, the chelating membrane used for removing trace metal ions has a high removal rate and low energy consumption.
2. Compared with plasma treatment, particle beam irradiation, surface grafting modification and other methods, the hydrophilic treatment carried out on the PTFE membrane in the present disclosure has a lower cost and simple and feasible operation.
3. The base membrane and membrane layer materials used in the present disclosure are resistant to acids, alkalis and organic solvents, have less dissolved substances, and are suitable for use in a purification process of high-purity electronic chemicals.

DETAILED DESCRIPTION

The technical solutions of the present disclosure are further described in non-restrictive detail in combination with preferred examples and accompanying drawings below. In description of the present disclosure, it is to be understood that orientation or position relations indicated by the terms, such as "center", "longitudinal", "transverse", "length", "width", "thickness", "up", "down", "front", "rear", "left", "right", "vertical", "horizontal", "top", "bottom", "inside", "outside", "clockwise", "anticlockwise", "axial", "radial" and "circumferential", are orientation or position relations as shown in the accompanying drawings. In addition, the terms "first" and "second" are used merely for the purpose of description and shall not be construed as indicating or implying relative importance or implying a quantity of indicated technical features. Therefore, the features restricted by the "first" or "second" may explicitly indicate or implicitly include at least one of the features. In description of the present disclosure, "a plurality of" means at least two, such as two and three, unless otherwise specifically defined. The examples described with reference to the accompanying drawings below are illustrative and are intended only to explain the present disclosure, which shall not be understood as limitations of the present disclosure.

Figure 1:
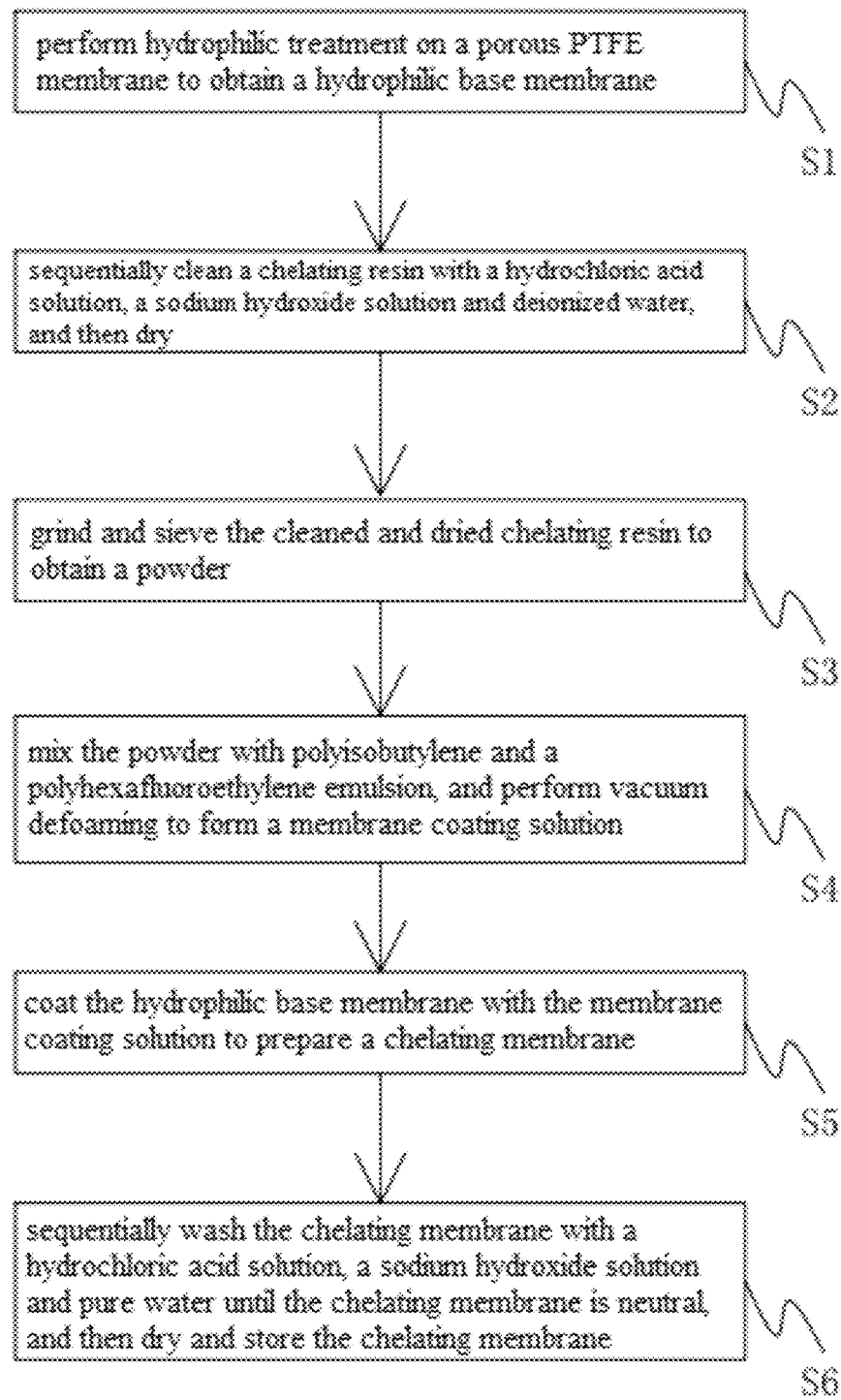
FIG. 1 is a flow chart of a preparation method for a chelating membrane in an example of the present disclosure.

As shown in FIG. 1, a preparation method for a chelating membrane for purifying wet electronic chemicals in an example of the present disclosure includes the following steps.

S1. Hydrophilic treatment was carried out on a porous PTFE membrane to obtain a hydrophilic base membrane.

Figure 2:
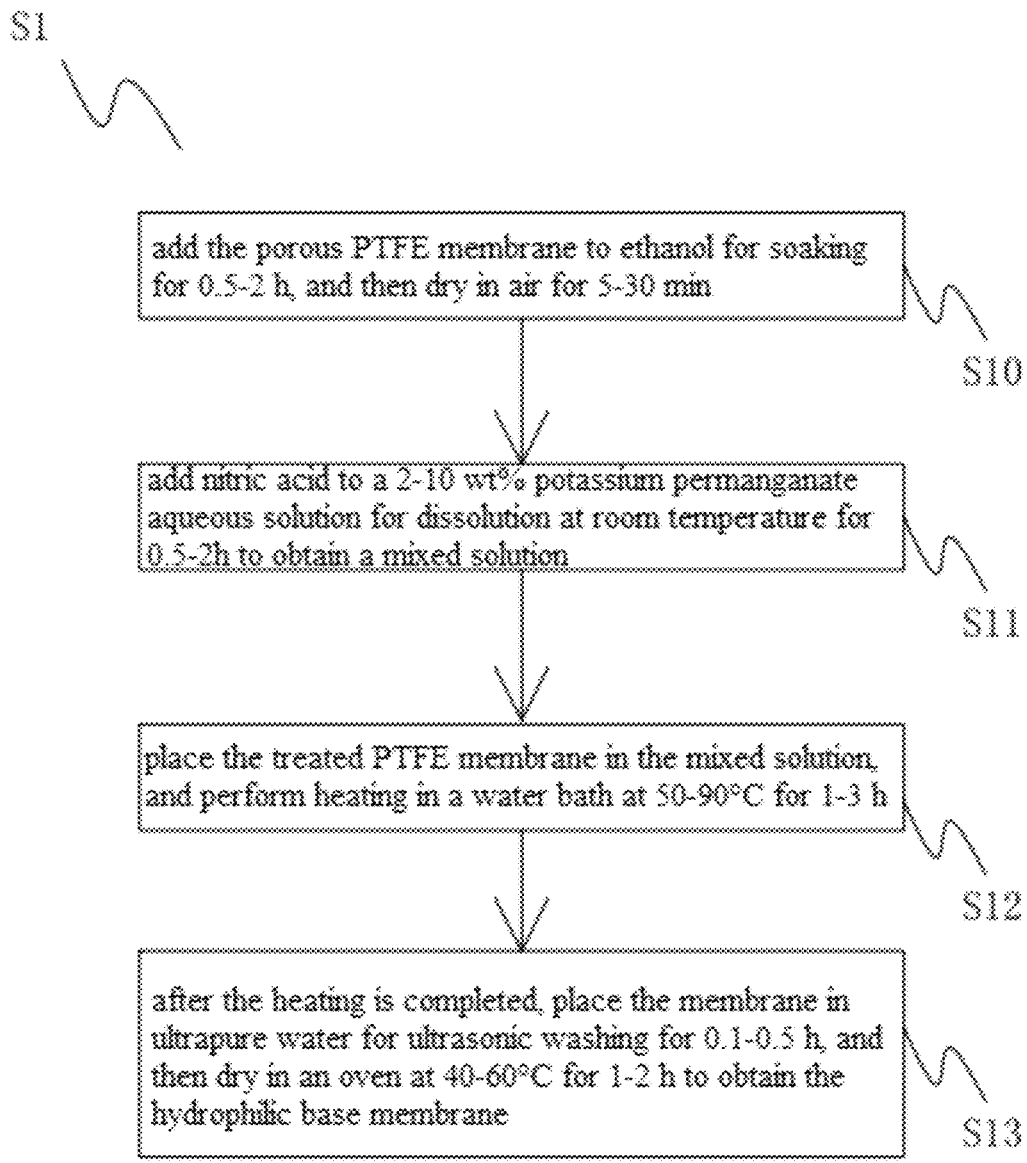
FIG. 2 is a flow chart of hydrophilic treatment of a PTFE base membrane.

As shown in FIG. 2, the step S1 specifically includes:

S10: adding the porous PTFE membrane to ethanol for soaking for 0.5-2 h, and then drying in air for 5-30 min;

S11: adding nitric acid to a 2-10 wt % potassium permanganate aqueous solution for dissolution at room temperature for 0.5-2 h to obtain a mixed solution, where a volume ratio of the nitric acid to the potassium permanganate aqueous solution was 1:(20-30);

S12: placing the treated PTFE membrane in the mixed solution, and performing heating in a water bath at 50-90° C. for 1-3 h; and S13: after the heating was completed, taking out the PTFE membrane, placing the membrane in ultrapure water for ultrasonic washing for 0.1-0.5 h, and then drying in an oven at 40-60° C. for 1-2 h to obtain the hydrophilic base membrane.

Compared with plasma treatment, particle beam irradiation, surface grafting modification and other methods, the hydrophilic treatment carried out on the PTFE membrane in the present disclosure has a low cost and is simple and feasible.

S2. A chelating resin was sequentially cleaned with a hydrochloric acid solution, a sodium hydroxide solution and deionized water, and then drying treatment was carried out.

Specifically, the chelating resin was sequentially cleaned with the hydrochloric acid solution, the sodium hydroxide solution and the deionized water, and then drying was carried out in an oven at 80-90° C. for 1-2 h, where the chelating resin was an iminodiacetic acid chelating resin. An iminodiacetic acid (IDA) type is a chelate with a "semi-EDTA" (EDTA is ethylenediamine tetraacetic acid) structure, which has a strong chelating effect on metal ions. The purpose of removing trace metal ions is achieved by preparing a chelating membrane.

S3. The cleaned and dried chelating resin was ground and sieved to obtain a powder.

Specifically, the cleaned and dried chelating resin was ground and sieved to obtain a 1,000- to 3,000-mesh powder.

S4. The powder was mixed with polyisobutylene and a polyhexafluoroethylene emulsion, and vacuum defoaming was carried out to form a membrane coating solution.

Specifically, the powder was mixed with the polyisobutylene and the polyhexafluoroethylene emulsion at 150-200° C. for 4-8 h, and vacuum defoaming was carried out for 3-6 h to form the membrane coating solution, where a mass ratio of the powder to the polyisobutylene to the polyhexafluoroethylene emulsion was (60-75):(5-10):(15-35). The raw materials used have less impurities and less dissolved substances of metal ions.

S5. The hydrophilic base membrane was coated with the membrane coating solution to prepare a chelating membrane.

Specifically, the hydrophilic base membrane was coated with the membrane coating solution at a temperature of 150-200° C. to prepare the chelating membrane.

S6. The chelating membrane was sequentially washed with a hydrochloric acid solution, a sodium hydroxide solution and pure water until the chelating membrane was neutral, and then the chelating membrane was dried and stored.

Specifically, the chelating membrane was sequentially washed with the hydrochloric acid solution, the sodium hydroxide solution and the pure water until the chelating membrane was neutral, then the chelating membrane was dried in an oven at 80-90° C. for 1-2 h, and the chelating membrane was stored for later use. The pure water was electronic-grade ultrapure water and was at a grade of equal to or greater than E1.1.

A preparation process of the chelating membrane is carried out in a clean environment, and the clean environment has a cleanliness class of equal to or less than Class 10,000.

The base membrane and membrane layer materials used in the present disclosure are resistant to acids, alkalis and organic solvents, have less dissolved substances, and are suitable for use in a purification process of high-purity electronic chemicals. Compared with traditional multistage distillation, the chelating membrane used for removing trace metal ions has a high removal rate and low energy consumption.

The present disclosure is further explained below in combination with specific examples. The examples are merely used for illustrating the present disclosure and are not intended to limit the scope of implementation of the present disclosure.

Example 1

S1. Hydrophilic treatment was carried out on a base membrane, specifically including the following steps:
S10: adding a porous PTFE membrane to ethanol for soaking for 0.5 h, and then drying in air for 5 min;
S11: adding 1 part of nitric acid to 20 parts of a 2 wt % potassium permanganate aqueous solution for dissolution at room temperature for 0.5 h to obtain a mixed solution;
S12: placing the PTFE membrane obtained in step S10 in the mixed solution obtained in step S11, and performing heating in a water bath at 50° C. for 1 h; and
S13: taking out the PTFE membrane treated in step S12, placing the membrane in ultrapure water for ultrasonic washing for 0.1 h, and then drying in an oven at 40° C. for 1 h to obtain a hydrophilic base membrane.
S2. An iminodiacetic acid chelating resin was sequentially cleaned with a hydrochloric acid solution, a sodium hydroxide solution and deionized water, and then drying was carried out in an oven at 80° C. for 1 h.
S3. The chelating resin obtained in step S2 was ground and sieved to obtain a 1,000-mesh powder.
S4. The powder obtained in step S3 was mixed with polyisobutylene and a polyhexafluoroethylene emulsion at a ratio of 60:5:35 at 150° C. for 4 h, and vacuum defoaming was carried out for 3 h to form a membrane coating solution. The raw materials used have less impurities and less dissolved substances of metal ions.
S5. The base membrane obtained in step S13 was coated with the membrane coating solution obtained in step S4 at a temperature of 150° C. to prepare a chelating membrane.
S6. The chelating membrane obtained in step S5 was sequentially washed with a hydrochloric acid solution, a sodium hydroxide solution and E1.1 ultrapure water until the chelating membrane was neutral, then the chelating membrane was dried in an oven at 80° C. for 1 h, and the chelating membrane was stored for later use.

The membrane was prepared in a clean environment at Class 1,000.

Example 2

S1. Hydrophilic treatment was carried out on a base membrane, specifically including the following steps:
S10: adding a porous PTFE membrane to ethanol for soaking for 2 h, and then drying in air for 30 min;
S11: adding 1 part of nitric acid to 30 parts of a 10 wt % potassium permanganate aqueous solution for dissolution at room temperature for 2 h to obtain a mixed solution;
S12: placing the PTFE membrane obtained in step S10 in the mixed solution obtained in step S11, and performing heating in a water bath at 90° C. for 3 h; and
S13: taking out the PTFE membrane treated in step S12, placing the membrane in ultrapure water for ultrasonic washing for 0.5 h, and then drying in an oven at 60° C. for 2 h to obtain a hydrophilic base membrane.
S2. An iminodiacetic acid chelating resin was sequentially cleaned with a hydrochloric acid solution, a sodium hydroxide solution and deionized water, and then drying was carried out in an oven at 90° C. for 2 h.
S3. The chelating resin obtained in step S2 was ground and sieved to obtain a 3,000-mesh powder.
S4. The powder obtained in step S3 was mixed with polyisobutylene and a polyhexafluoroethylene emulsion at a ratio of 75:10:15 at 200° C. for 8 h, and vacuum defoaming was carried out for 6 h to form a membrane coating solution. The raw materials used have less impurities and less dissolved substances of metal ions.
S5. The base membrane obtained in step S13 was coated with the membrane coating solution obtained in step S4 at a temperature of 200° C. to prepare a chelating membrane.
S6. The chelating membrane obtained in step S5 was sequentially washed with a hydrochloric acid solution, a sodium hydroxide solution and E1.1 ultrapure water until the chelating membrane was neutral, then the chelating membrane was dried in an oven at 90° C. for 2 h, and the chelating membrane was stored for later use.

The membrane was prepared in a clean environment at Class 1,000.

Example 3

S1. Hydrophilic treatment was carried out on a base membrane, specifically including the following steps:
S10: adding a porous PTFE membrane to ethanol for soaking for 1 h, and then drying in air for 20 min;
S11: adding 1 part of nitric acid to 25 parts of a 6 wt % potassium permanganate aqueous solution for dissolution at room temperature for 1 h to obtain a mixed solution;
S12: placing the PTFE membrane obtained in step S10 in the mixed solution obtained in step S11, and performing heating in a water bath at 80° C. for 2 h; and
S13: taking out the PTFE membrane treated in step S12, placing the membrane in ultrapure water for ultrasonic washing for 0.2 h, and then drying in an oven at 50° C. for 1.5 h to obtain a hydrophilic base membrane.
S2. An iminodiacetic acid chelating resin was sequentially cleaned with a hydrochloric acid solution, a sodium hydroxide solution and deionized water, and then drying was carried out in an oven at 85° C. for 1.5 h.
S3. The chelating resin obtained in step S2 was ground and sieved to obtain a 2,000-mesh powder.
S4. The powder obtained in step S3 was mixed with polyisobutylene and a polyhexafluoroethylene emulsion at a ratio of 70:8:22 at 180° C. for 6 h, and vacuum defoaming was carried out for 5 h to form a membrane coating solution. The raw materials used have less impurities and less dissolved substances of metal ions.

S5. The base membrane obtained in step S13 was coated with the membrane coating solution obtained in step S4 at a temperature of 180° C. to prepare a chelating membrane.

S6. The chelating membrane obtained in step S5 was sequentially washed with a hydrochloric acid solution, a sodium hydroxide solution and E1.1 ultrapure water until the chelating membrane was neutral, then the chelating membrane was dried in an oven at 85° C. for 1.5 h, and the chelating membrane was stored for later use.

The membrane was prepared in a clean environment at Class 1,000.

A metal ion removal ability of the chelating membranes prepared in Examples 1-3 in methanol was tested on an experimental platform, and experimental results are shown in Table 1.

TABLE 1

Experimental results in Examples 1-3

| Example | Base membrane before treatment Contact angle (°) | Base membrane after treatment Contact angle (°) | Representative metal ions | Content of an ion in a methanol raw material (ppb) | Content of an ion in methanol after treatment with a chelating membrane (ppb) |
|---|---|---|---|---|---|
| 1 | 125 | 80 | Calcium (Ca) | 0.2 | 0.05 |
|  |  |  | Chromium (Cr) | 0.2 | 0.04 |
|  |  |  | Copper (Cu) | 0.3 | 0.05 |
|  |  |  | Gold (Au) | 0.2 | 0.05 |
|  |  |  | Iron (Fe) | 0.1 | 0.04 |
|  |  |  | Lead (Pb) | 0.1 | 0.04 |
| 2 | 125 | 70 | Calcium (Ca) | 0.2 | 0.05 |
|  |  |  | Chromium (Cr) | 0.2 | 0.04 |
|  |  |  | Copper (Cu) | 0.3 | 0.03 |
|  |  |  | Gold (Au) | 0.2 | 0.02 |
|  |  |  | Iron (Fe) | 0.1 | 0.04 |
|  |  |  | Lead (Pb) | 0.1 | 0.05 |
| 3 | 125 | 65 | Calcium (Ca) | 0.2 | 0.03 |
|  |  |  | Chromium (Cr) | 0.2 | 0.04 |
|  |  |  | Copper (Cu) | 0.3 | 0.05 |
|  |  |  | Gold (Au) | 0.2 | 0.03 |
|  |  |  | Iron (Fe) | 0.1 | 0.03 |
|  |  |  | Lead (Pb) | 0.1 | 0.05 |

The above table is used for illustrating components contained in the methanol raw material, and contents of the components are closely related to sources, but the applicability of the present disclosure is not limited thereto. After filtration with the chelating membrane prepared by production, the contents of ions in the methanol raw material are significantly reduced.

In the present disclosure, the chelating membrane used for removing trace metal ions has a high removal rate and low energy consumption. Moreover, compared with plasma treatment, particle beam irradiation, surface grafting modification and other methods, the hydrophilic treatment carried out on the PTFE membrane has a lower cost and simple and feasible operation. Meanwhile, the base membrane and membrane layer materials are resistant to acids, alkalis and organic solvents, have less dissolved substances, and are suitable for use in a purification process of high-purity electronic chemicals.

The above examples only express several embodiments of the present disclosure in more specific and detailed description, which shall not be construed as limitations of the scope of the invention patent. It is to be noted that for those of ordinary skill in the art, various transformations and improvements can also be made without departing from the concept of the present disclosure, and all the transformations and improvements fall within the scope of protection of the present disclosure. Therefore, the scope of protection of the invention patent shall be defined by the attached claims.

The invention claimed is:

1. A preparation method for a chelating membrane for purifying wet electronic chemicals, comprising the following steps:
    performing hydrophilic treatment on a porous PTFE membrane to obtain a hydrophilic base membrane;
    sequentially cleaning a chelating resin with a hydrochloric acid solution, a sodium hydroxide solution and deionized water, and then drying, wherein the chelating resin is an iminodiacetic acid chelating resin;
    grinding and sieving the cleaned and dried chelating resin to obtain a powder;
    mixing the powder with the polyisobutylene and the polyhexafluoroethylene emulsion at 150-200° C. for 4-8 h, and carrying out vacuum defoaming for 3-6 h to form the membrane coating solution; and a mass ratio of the powder to the polyisobutylene to the polyhexafluoroethylene emulsion is (60-75):(5-10):(15-35); and
    coating the hydrophilic base membrane with the membrane coating solution to prepare a chelating membrane.

2. The preparation method for a chelating membrane according to claim 1, further comprising the following steps:
    sequentially washing the chelating membrane with a hydrochloric acid solution, a sodium hydroxide solution and pure water until the chelating membrane is neutral, and then drying and storing the chelating membrane.

3. The preparation method for a chelating membrane according to claim 1, wherein the step of performing hydrophilic treatment on a porous PTFE membrane to obtain a hydrophilic base membrane specifically comprises the following steps:
    adding the porous PTFE membrane to ethanol for soaking for 0.5-2 h, and then drying in air for 5-30 min;
    adding nitric acid to a 2-10 wt % potassium permanganate aqueous solution for dissolution at room temperature for 0.5-2 h to obtain a mixed solution;
    placing the treated PTFE membrane in the mixed solution, and performing heating in a water bath at 50-90° C. for 1-3 h; and
    after the heating is completed, placing the membrane in ultrapure water for ultrasonic washing for 0.1-0.5 h, and then drying in an oven at 40-60° C. for 1-2 h to obtain the hydrophilic base membrane.

4. The preparation method for a chelating membrane according to claim 3,
    wherein a volume ratio of the nitric acid to the potassium permanganate aqueous solution is 1:(20-30).

5. The preparation method for a chelating membrane according to claim 1, wherein the steps of sequentially cleaning a chelating resin with a hydrochloric acid solution, a sodium hydroxide solution and deionized water, and then drying specifically comprise:
    sequentially cleaning the chelating resin with the hydrochloric acid solution, the sodium hydroxide solution and the deionized water, and then drying in an oven at 80-90° C. for 1-2 h.

6. The preparation method for a chelating membrane according to claim 1, wherein the powder is 1,000-3,000 mesh.

7. The preparation method for a chelating membrane according to claim 1, wherein the step of coating the hydrophilic base membrane with the membrane coating solution to prepare a chelating membrane specifically comprises:

coating the hydrophilic base membrane with the membrane coating solution at a temperature of 150-200° C. to prepare the chelating membrane.

8. The preparation method for a chelating membrane according to claim 2, wherein the steps of sequentially washing the chelating membrane with a hydrochloric acid solution, a sodium hydroxide solution and pure water until the chelating membrane is neutral, and then drying and storing the chelating membrane specifically comprise:

sequentially washing the chelating membrane with the hydrochloric acid solution, the sodium hydroxide solution and the pure water until the chelating membrane is neutral, then drying the chelating membrane in an oven at 80-90° C. for 1-2 h, and storing the chelating membrane for later use; and the pure water is electronic-grade ultrapure water and is at a grade of equal to or greater than E1.1.

9. The preparation method for a chelating membrane according to claim 1, wherein a preparation process of the chelating membrane is carried out in a clean environment, and the clean environment has a cleanliness class of equal to or less than Class 10,000.

* * * * *